United States Patent [19]

Stuckey et al.

[11] Patent Number: 4,805,523

[45] Date of Patent: Feb. 21, 1989

[54] COMBINATION ELECTRIC COFFEE MAKER AND WATER HEATER

[75] Inventors: Carl E. Stuckey, Decatur, Ga.; Thomas C. Maddocks, Racine, Wis.

[73] Assignee: Sunbeam Corporation, Downers Grove, Ill.

[21] Appl. No.: 130,035

[22] Filed: Dec. 7, 1987

[51] Int. Cl.$^4$ ............................................. A47J 31/00
[52] U.S. Cl. ...................................... 99/281; 99/299; 137/599.2; 219/311
[58] Field of Search .................. 99/279, 280, 281, 282, 99/283, 284, 288, 290, 299, 300, 304, 305; 426/433; 137/599.2; 219/311, 328, 322, 436, 438, 441

[56] References Cited

U.S. PATENT DOCUMENTS

| | | | |
|---|---|---|---|
| 2,694,412 | 11/1954 | Jaros | 137/599.2 |
| 3,423,209 | 1/1969 | Weber | 99/299 |
| 4,147,180 | 4/1979 | Steele | 137/599.2 |
| 4,614,859 | 9/1986 | Beckering | 99/288 |

Primary Examiner—Robert W. Jenkins
Attorney, Agent, or Firm—Neil M. Rose

[57] ABSTRACT

A combination electric coffee maker and water heater including reservoir means for electrically heating a volume of water to be used for brewing coffee or for making an "instant beverage" using powdered material. The reservoir means having a dispensing valve adapted to provide, selectively, either a rapid rate of flow for producing instant beverages or a slow rate of flow for brewing coffee.

15 Claims, 4 Drawing Sheets

COMBINATION ELECTRIC COFFEE MAKER AND WATER HEATER

FIELD OF THE INVENTION

This invention relates generally to appliances for preparing hot beverages, and more particularly a combined electric coffee maker and hot water dispenser, the dispensed hot water being typically usable for making tea, instant coffee and other beverages.

BACKGROUND OF THE INVENTION AND PRIOR ART

The portable electric coffee maker has for many years been one of the most popular domestic electric appliances. The market for such appliances has included the full size coffee makers which have a capacity of ten to twelve cups and the smaller size coffee makers intended for use by individuals or small families requiring only a cup or two of coffee at a time. The market for the small coffee maker has developed largely as a consequence of the larger coffee makers being incapable of or inefficient in brewing small quantities of coffee. Another product which has gained in popularity and which meets the needs of the single person household is the electric water heater and dispenser which is adapted to heat very rapidly one or two cups of water to a temperature at or near the boiling point. This hot water is then used either in a drip coffee making attachment or to make instant tea or coffee. Such an attachment is shown in Gronwick, et al. U.S. Pat. No. 4,069,751. Examples of such water heating appliances are shown in the patents to Augustine, et al. U.S. Pat. Nos. 3,878,360, Belinkoff 4,165,681 and Beckering, et al. 4,614,859. In all of these prior art patents the appliance is manually switched on to energized a heating element which heats the water, such energization terminating when a thermostat senses that the water has been brought up to the near boiling temperature. At that time, a manually controlled valve is used to dispense the heated water into a separate coffee making attachment or into a container for the instant tea, coffee, cocoa or other instant beverage making material. The Belinkoff patent includes a normally closed valve which is operated by a lever which is spring biased to the valve closing position. Means are provided to lock the lever in the valve open position so that it is not necessary to maintain pressure on the operating lever throughout the time in which the hot water is being dispensed.

It is also known in the art to provide coffee makers which the facility to make different types of coffee, i.e., expresso or cappuccino in the same coffee maker. It is also known in the art to provide a coffee maker with a multiple position valve which permits a coffee brewer to dispense hot water. The foregoing are disclosed in the patents to Knecht U.S. Pat. Nos. 4,204,465 and Lockett 3,179,035.

SUMMARY OF THE INVENTION

Our invention is directed to a combination electric coffee maker and water heater which has a thermostatically controlled, heated reservoir within which a small quantity of water is rapidly heated to a temperature slightly below the boiling point at which temperature it is suitable for brewing coffee or making various types of instant beverages. Associated with the reservoir within which the water is heated is a dispensing valve which is manually movable to any one of three positions, two of which permit the contents of the reservoir to be dispensed at various rates of flow. The slower flow rate is suitable for making drip coffee and is used when the water is dispensed into a coffee ground containing basket associated with a carafe for receiving brewed coffee. In the other dispensing position, the heated water is dispensed more rapidly since there is no brewing time to be accommodated and the objective is to transfer the heated water from the reservoir to the container for mixing with the instant coffee or tea as quickly as possible.

Accordingly, it is an object of the present invention to provide an improved electric coffee maker and hot water heater which permits the making of drip coffee or the efficient dispensing of heated water for instant beverages.

It is another object of the present invention to provide an improved electric coffee maker and water heater having a novel dispensing valve which permits heated water to be dispensed from a heating reservoir at either one of two selected rates.

It is still another further object of the present invention to provide an electric coffee maker and water heater having a three-position valve for dispensing heated water at a slow rate for brewing coffee from grounds or a more rapid rate for use in making instant beverages.

Further objects and advantages of the instant invention will become obvious to one skilled in the art as the following description proceeds, and the features of novelty which characterize the invention will be pointed out in the claims annexed to and forming a part of the specification.

Figure 2:
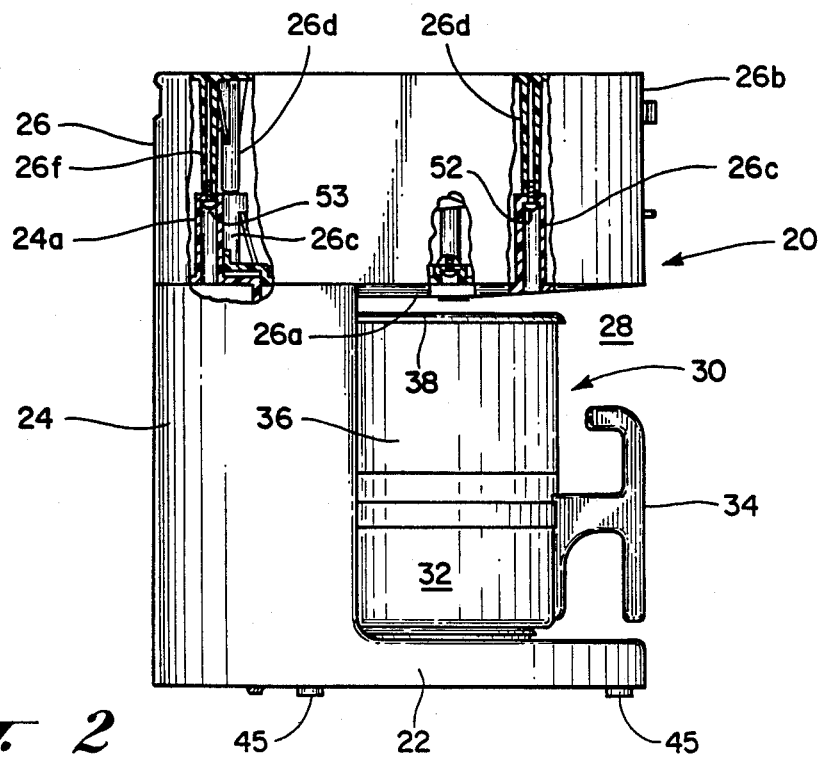
FIG. 2 is a side elevatial view thereof with portions of the upper housing cut away to illustrate the manner in which the housing parts are assembled together.
Figure 4:
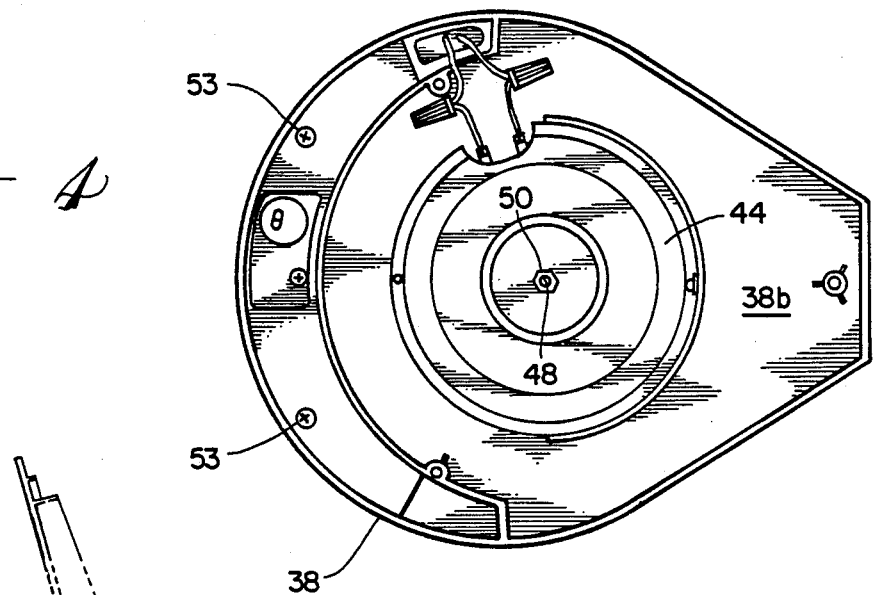
FIG. 4 is a bottom plan view with the bottom cover removed.
Figure 3:
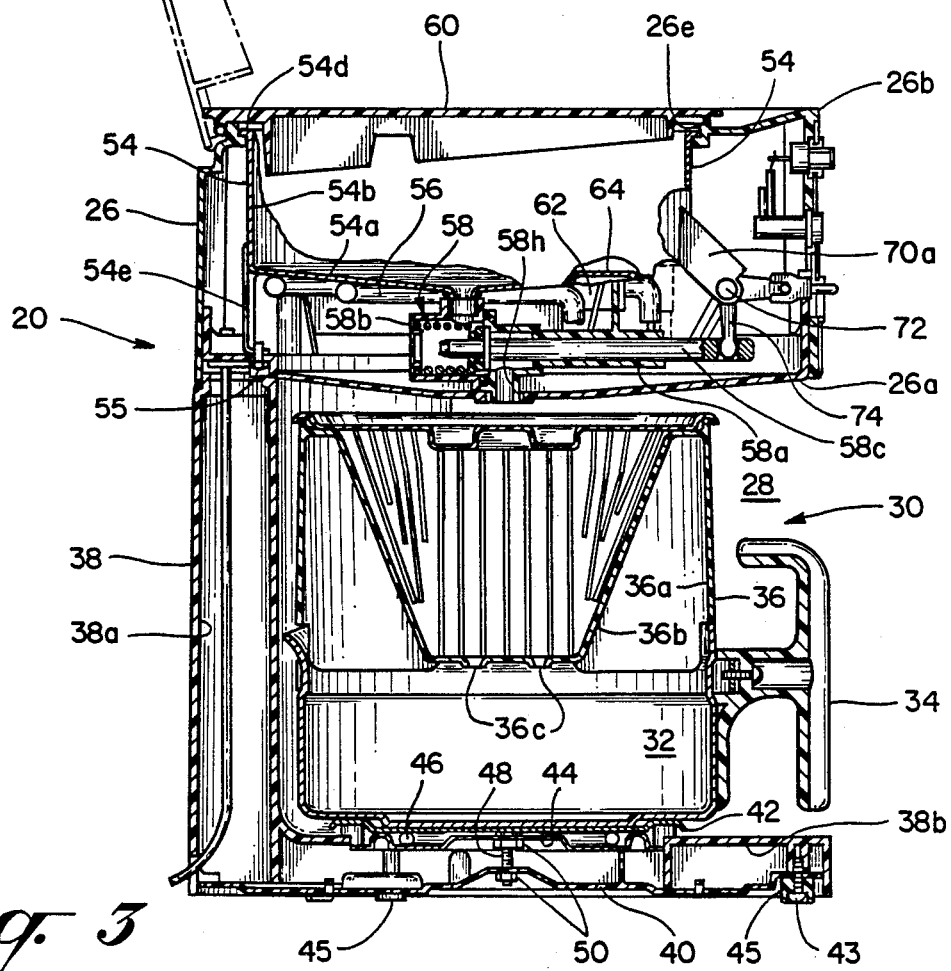
FIG. 3 is a side elevational view shown in section, the section taken essentially through the central axis of the coffee maker.

Referring to the drawings, there is shown an electric coffee maker and water heater designated generally by reference numeral 20. The coffee maker and water heater 20 is provided with a base 22, a column support 24 and a head 26 which together form a somewhat C-shaped housing having a laterally facing recess 28 within which the drip coffee making attachment 30 may be positioned. The drip coffee making attachment 30 includes a carafe 32 which has a handle 34 and which supports a coffee ground basket 36 which, in turn, supports a spreader plate 38, as is best shown in FIGS. 2 and 3. The coffee basket 36 has an outer cylindrical portion 36a which rests upon the upper edge of the carafe 32. Formed integrally with the cylindrical portion 36a is a central, conical portion 36b which is shaped to receive a paper filter for receiving ground coffee for making brewed coffee. The conical portion 36b is provided with apertures 36c through which the brewed coffee passes on route to the carafe 32.

The base 22 and the column support 24 of the coffee maker 20 are made up of a molded housing portion 38 which is formed with a vertically extending recess 38a and a base recess 38b, the base recess being closed by a lower plate 40 and an upper warming plate 42. The warming plate 42 is substantially coextensive with a second plate 44 between which there is clamped a rope heater 46 which serves to warm the plate 42 and the carafe 32 which may be placed thereon. A stud 48 secured to the warming plate 42 has threaded assembly nuts 50 for securing the three plates 40, 42 and 44 together and assembled to the housing portion 38. Three screws 43, one of which is shown in FIG. 3, extend through the lower plate 40 into engagement with the molded housing portion 38 to secure the plate 40 in position, as shown, and also to retain three support feet 45.

Figure 8:
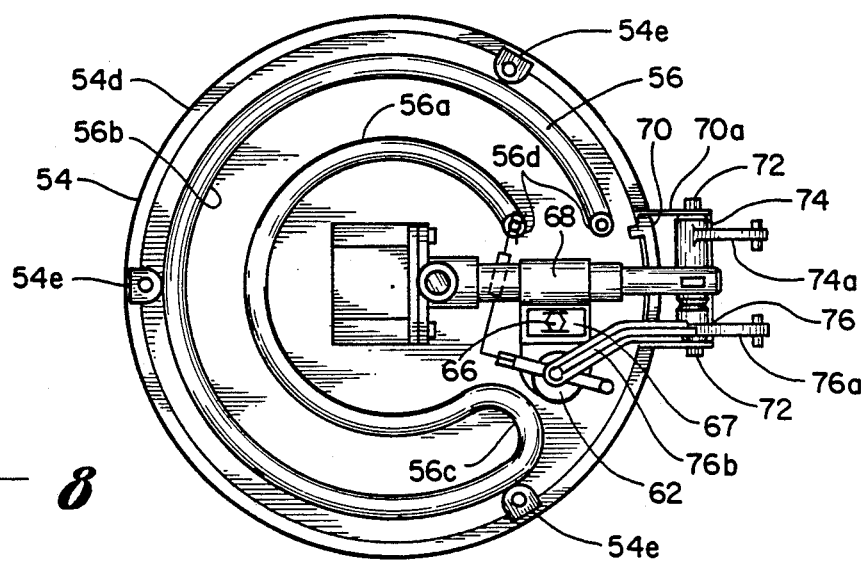
FIG. 8 is a bottom plan view of the water heating reservoir.
Figure 9:
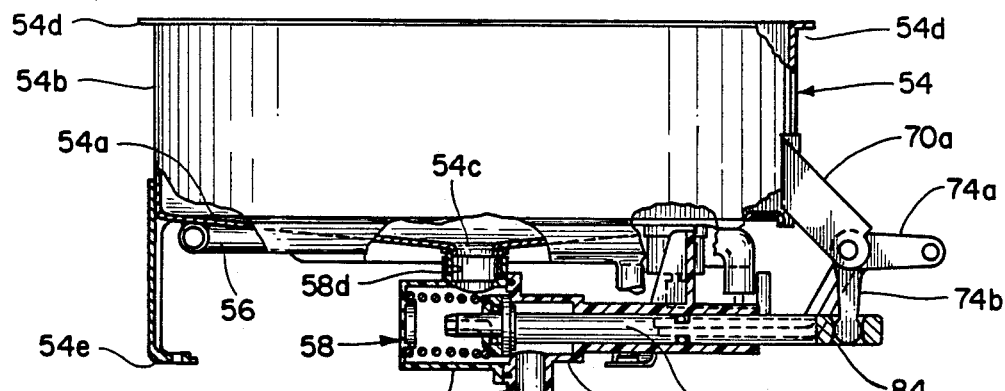
FIG. 9 is a side elevational view of the water heating reservoir with portions of the dispensing valve cut away.
Figure 10:
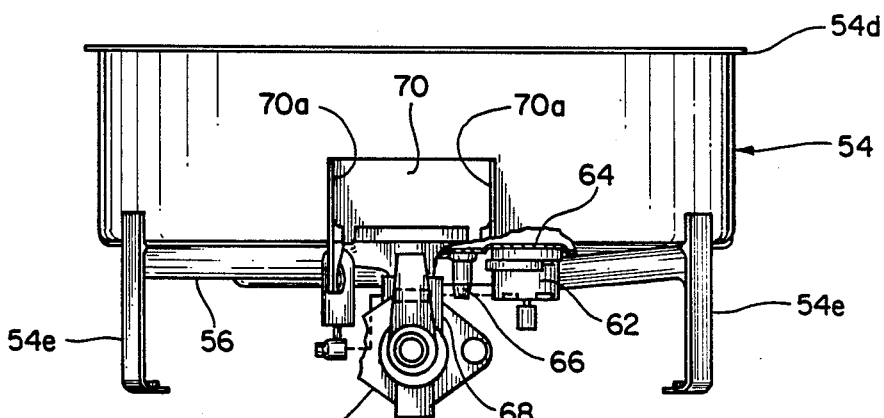
FIG. 10 is a front view of the water heating reservoir.

The head 26, as shown in FIG. 3, has a lower housing portion 26a and an upper housing portion 26b secured together by screws 52 which join complementary bosses 26c and 26d extending from opposite walls of the lower and upper housing portions 26a and 26b, respectively, as are shown in FIG. 2. The housing portions 26a and 26b form an enclosure within which cup shaped reservoir 54 is received. As shown in FIGS. 8, 9 and 10, the reservoir 54 has brazed to the bottom thereof a sheathed electric heating element 56 which is in the form of a double C-shaped loop. The configuration of the element 56 provides good heat transfer to the contents of the reservoir 54 and still accommodates the mounting of the valve means and temperature control means on the bottom of the reservoir 54. The sheathed heating element 56 is typical of the heating elements used in heating appliances having a tubular sheath within which is enclosed an elongated resistance heater insulated electrically from the sheath by compacted magnesium oxide. The heating element 56 is brazed to the reservoir 54 which has a bottom 54a and a cylindrical side wall 54b. In the center of the bottom, the reservoir 54 is provided with an outlet opening 54c for discharge of the reservoir contents through a valve 58. At its upper edge, reservoir 54 is formed with an annular flange 54d which engages the upper housing portion 26b around the periphery of an opening 26e.

In order to retain the head 26 assembled to the column 24, there are provided abutting bosses 24a and 26f molded integrally with the column 24 and the upper housing portion 26b as shown in FIG. 2. Screws 53 extend upwardly through openings in bosses 24a into threaded engagement with bosses 26f securing head 26 to column 24.

The reservoir 54 is supported by threes support legs 54e which are spaced equally around the bottom of the reservoir 54 as may be best seen in FIG. 8. The three legs 54e are secured by screws 55 to the lower housing portion 26a, one of the screws being shown in FIG. 3.

Hingedly secured to the upper housing portion 26b is a reservoir cover 60 which is pivotal between the horizontal position shown in FIG. 3 closing the top of the reservoir 54 to the open position shown in dashed lines in FIG. 3. In the open position, water may readily be poured into the reservoir 54 where it is heated by the element 56.

The ideal temperature for water for brewing coffee or for making most instant beverages is water at a temperature slightly below the boiling point. In order to control the period during which the heating element 56 will be energized, there is a thermostat 62 provided on the bottom of the reservoir 54. As is shown in FIGS. 3, 9 and 10, the bottom of the reservoir 54 is formed with a recessed and flattened portion 64 against which the thermostat 62 is mounted. For the purpose of mounting the thermostat and the valve 58, there is provided a stud 66 as shown in FIG. 10 brazed to the bottom 54a of the reservoir 54. Received on the stud 66 is a bracket 68 which is retained on the stud 66 by a retainer 67 (see FIG. 8) and which has portions extending around the valve 58 and extending across the thermostat 62 to urge it against the bottom of the reservoir 54.

Figure 5:
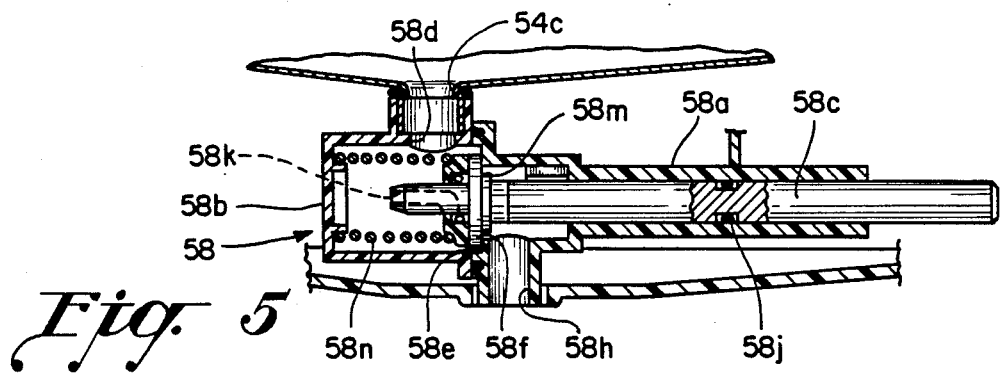
FIG. 5 is a sectional view of the water dispensing valve shown in the closed position.
Figure 6:
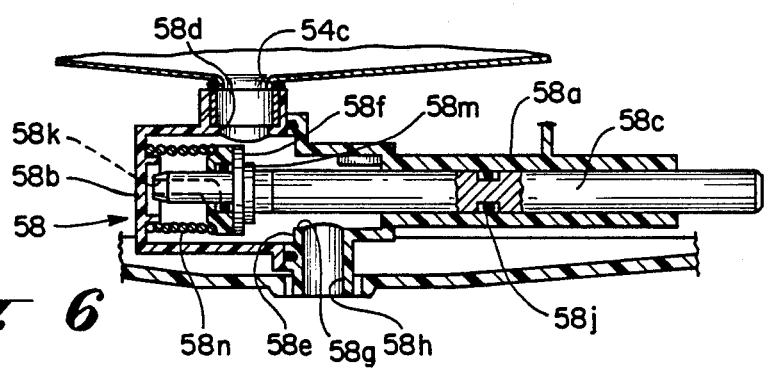
FIG. 6 is a sectional view similar to FIG. 5 but with the valve shown in the rapid dispense position used for making instant beverages.
Figure 7:
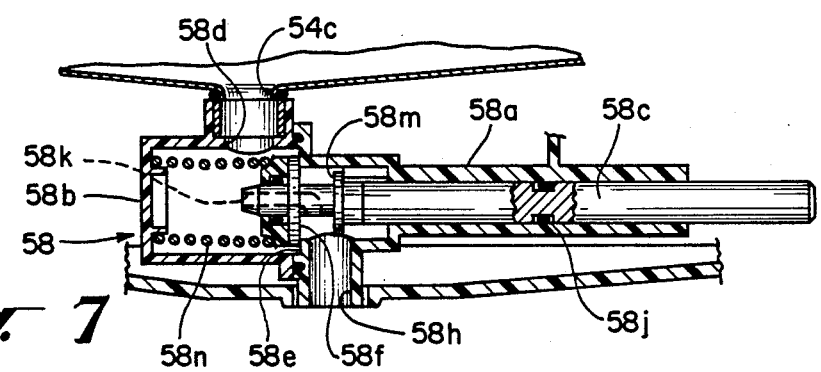
FIG. 7 is a sectional view similar to FIGS. 5 and 6 but showing the valve in the dispensing position used for making brewed coffee.

The valve 58 comprises a valve body 58a, a valve cover 58b and a valve member 58c. The valve cover 58b has an inlet opening 58d through which water enters the valve cover. The valve 58 is adapted to be placed in three different positions as illustrated in FIGS. 5, 6 and 7. FIG. 5 illustrates the closed position of valve 58. FIG. 6 illustrates the valve in high flow position, and FIG. 7 illustrates the low flow rate dispensing position used for brewing coffee. In a preferred embodiment of the invention, the coffee maker 20 had a nominal four-cup capacity with the reservoir 54 having a 22 ounce capacity and the carafe 32 having a 30 ounce capacity. In the coffee brewing position of valve 58, the flow rate was 5 ounces per minute while in the dispense position of the valve 58 the flow rate was more than 22 ounces per minute. In FIG. 5, with the valve member 58c in its intermediate position, (as compared to the left position shown in FIG. 6, and the right position shown in FIG. 7), a valve seat 58e is closed by a closure member 58f. The closure member 58f is mounted on the valve member 58c for limited slidable axial movement and is seated against a retaining ring 58m, being urged against the seat 58e by a coil spring58n. When the valve member 58c is displaced to the left as shown in FIG. 6, the ring 58m causes the valve closure 58f to be unseated, compressing the spring 58n and allowing liquid to pass through an opening 58g and thence outwardly through an outlet passage 58h, as shown in FIG. 6. As may be seen in FIG. 7, the valve member 58c is provided with an O-ring gasket 58j which prevents water from leaking to the right along the valve member 58c.

The valve position shown in FIG. 6 permits the maximum rate of flow and is selected when it is desired to dispense the heated water rapidly in order to make instant tea or coffee or another type of instant beverage. In the above described preferred embodiment of the invention, the reservoir contents of 22 ounces would be entirely dispensed in less than one minute with the valve 58m in the dispense position of FIG. 6.

When the valve 58 is positioned to make brewed coffee using the basket 36 and the carafe 32, it is necessary to dispense the heated water slowly so that the water will not overflow the spreader plate 38 and will be delivered at a rate which can be accommodated within the basket 36 without having to provide a conical portion 36b and filter which will accommodate the entire contents of the reservoir 54. Accordingly, when it is desired to make brewed coffee, the valve member 58 is actuated to the position shown in FIG. 7 after the water has been heated to the desired temperature. Upon moving the valve member 58c to the right, from the position shown in FIG. 5, the L-shaped passageway 58k is opened to permit water to flow first axially and then downwardly through the valve member 58c and out through the opening 58h, as shown in FIG. 7. The passageway 58k meters the water flow so that the basket 36 receives the water at an acceptable rate to pass through the coffee grounds and the filter contained in the conical portion 56b. As is evident from FIG. 7, the closure 58f is against the seat 58e, restricting the water flow to the passageway 58k. As indicated above in the preferred embodiment, the rate of flow for brewing coffee with valve 58 in the position of FIG. 7 was 5 ounces per minute. This rate is directly related to the size of the basket 36b and the filter that is employed.

Mounted on the front wall of the reservoir 54 is a U-shaped bracket 70 having downwardly and outwardly extending legs 70a having aligned openings for supporting a pivot pin 72 which supports a pair of bell cranks or levers 74 and 76. The bell cranks 74, 76 have forwardly extending actuators 74a and 76a which are engaged by manually actuated slide members 78 and 80, respectively.

Figure 1:
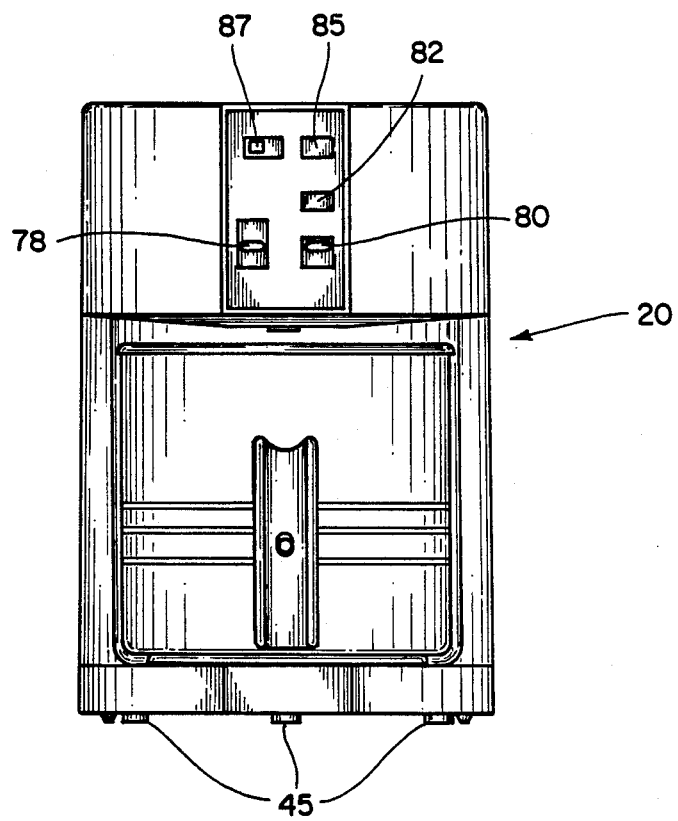
FIG. 1 is a front elevational view of a coffee maker embodying our invention.

As may be seen in FIG. 1, the slide member or reservoir heater control button 80 may be depressed to actuate the arm 76a and cause an output arm 76b to push upwardly against the thermostat 62, thereby closing the thermostat and allowing power to flow to the heating element 56. The thermostat 62 is mounted to respond rapidly to the temperature of the water within the reservoir 54 and is selected with a shutoff temperature so that it will open the circuit when the water contained therein is slightly below the boiling temperature. When the thermostat 62 is in the closed circuit position, a light 82 is illuminated, signaling the fact that the water is being heated to the desired temperature. As may be seen in the circuit diagram of FIG. 11, the signal light 82 is connected in series with resistance 83 in parallel with the heating element 56. When the thermostat 62 opens the circuit to element 56, the light 82 is extinguished. At that point, the operator may use the slider member 78 to move the bell crank arm 74a either upwardly to the brew position of the valve 58 or downwardly for the dispense position of the valve 58.

Figure 11:
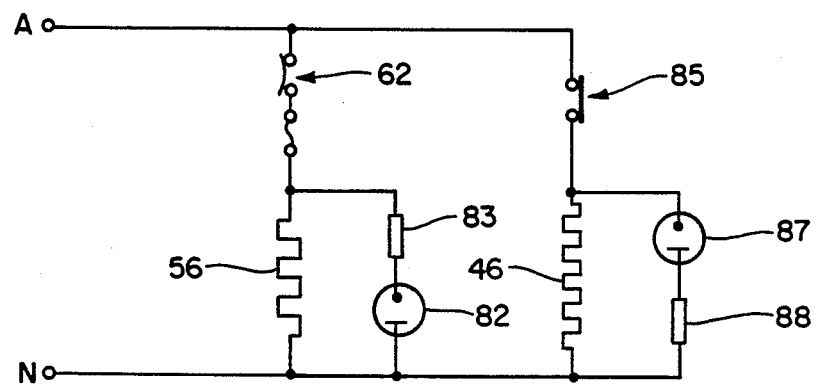
FIG. 11 is a schematic wiring diagram of the circuit of the coffee maker.

Referring again to the circuit diagram of FIG. 11, we note that the rope heater 46 is connected in series with a switch 85 located on the front of the coffee maker above the signal light 82. When the switch 85 is closed, a second signal light 87 is illuminated. The light 87 and a resistance 88 are connected in parallel with the rope heater 46 as shown in FIG. 11.

As is best shown in FIG. 9, the bell crank 74 has a second arm 74b which engages in an opening 84 in the valve member 58c to interconnect the two parts. Thus, rotation of the bell crank 74 causes the valve member 58c to move axially. When the bell crank which is shown in the valve closed position in FIG. 9 is rotated clockwise, the valve member 58c is displaced to the position shown in FIG. 6, causing the rapid dispensing of the contents of the water reservoir 54. Further, when the bell crank 74 is moved counterclockwise as shown in FIG. 9, the valve member 58c moves to the position shown in FIG. 7, providing the slower controlled dispensing of the liquid suitable for brewing drip coffee in the basket 36 and the carafe 32.

The foregoing provides a simple and effective means of either brewing small amounts of coffee or heating small amounts of water for making instant beverages. The valve 58 with its means for selecting either one of two rates of liquid flow provides the means for making coffee or quickly dispensing the entire quantity of heated water without requiring the user to become involved in any continuous monitoring of the flow to avoid problems. The valve 58 provides the means for initially selecting the rate of flow appropriate for the use to which the appliance is then being placed.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A combination coffee maker and water heater comprising means including a reservoir having heating means for heating a quantity of water to an elevated temperature for food and beverage preparation, said heating means including means responsive to water temperature to de-energize said heating means when said water has been heated to said elevated temperature, said reservoir having an outlet with valve means for dispensing said quantity of water at either one of two different rates of flow into either coffee brewing apparatus or a receptacle for making instant beverages, said valve means having a manually positionable control movable to a first position in which said quantity of water will be dispensed at a first rate of flow which will be accommodated in said coffee brewing apparatus and movable to a second position in which said quantity of water will be dispensed at a second rate of flow which is substantially greater than said first rate of flow and which is greater than maximum flow rate accommodated by said coffee brewing apparatus, said valve means including a valve body supported by said reservoir and a movable valve mounted in said valve body, said valve member being movable from a central closed position in one direction to obtain said first rate of flow through said valve means and in an opposite direction to obtain said second rate of flow.

2. The combination coffee maker and water heater of claim 1 wherein said manually positionable control comprises a first bell crank having one arm engaging a slide member and a second arm engaging said valve member to slide said valve member in a rectilinear direction.

3. The combination coffee maker and water heater of claim 2 wherein said water temperature responsive means includes a resetable thermostatic switch which may be manually closed and which opens at said selected temperature, a second bell crank having one arm positioned for manual actuation and another arm engaged with said thermostatic switch, and means carried by said reservoir to support said first and second bell cranks for rotation about a common axis.

4. A combination coffee maker and water heater comprising means including a reservoir having heating means for heating a quantity of water to an elevated temperature for food and beverage preparation, said heating means including means responsive to water temperature to de-energize said heating means when said water has been heated to said elevated temperature, said reservoir having an outlet with valve means for dispensing said quantity of water at either one of two different rates of flow by gravity from an unpressurized reservoir into either coffee brewing apparatus or a receptacle for making instant beverages, said valve means having a manually positionable control movable to a first position in which said quantity of water will be dispensed at a first rate of flow which will be accommodated in said coffee brewing apparatus and movable to a second position in which said quantity of water will be dispensed at a second rate of flow which is substantially greater than said first rate of flow and which is greater than maximum flow rate accommodated by said coffee brewing apparatus, a housing having a head portion enclosing said reservoir and valve means and a base and column portion supporting said head portion, a drip coffee maker, said base having a heated plate for supporting said drip coffee maker beneath said head whereby heated water from said reservoir is dispensed to flow by gravity into said coffee maker, said coffee maker including a coffee basket for receiving a filter and ground coffee supported by a carafe for receiving brewed coffee, the rate of flow of water through said basket being substantially equal to said first rate of flow.

5. The combination coffee maker and water heater of claim 4 wherein said second rate of flow is on the order of four times said first rate of flow.

6. A combination drip coffee maker and water heater comprising means including a reservoir having heating means for heating a quantity of water from room temperature to a selected temperature suitable for extracting coffee from grounds, said reservoir being open to atmospheric pressure, a cup-shaped vessel, a filter basket for receiving ground coffee and selectively positionable on said vessel to provide brewed coffee when hot water is poured through said filter basket, a housing supporting said reservoir above said vessel and filter basket, said reservoir having an outlet with valve means for dispensing said quantity of water at either one of two different rates of gravity flow into said filter basket to make brewed coffee or directly into said vessel for making instant beverages, said valve means having a manually positionable control movable to a first position in which said quantity of water will be dispensed for gravity flow at a first uniform rate of flow which will be substantially equal to the flow through said filter basket and movable to a second position which said quantity of water will be dispensed for gravity flow at a second uniform rate of flow which is substantially greater than the maximum flow rate through said filter basket.

7. The combination coffee maker and water heater of claim 6 wherein said housing comprises a base and column portion and a head portion which supports and encloses said reservoir, said head portion having a top opening within which said reservoir is received, said reservoir being accessible to be filled with water through said top opening, means on said base for supporting said vessel beneath said valve means to receive water from said valve means, a heater in said base to maintain the heated temperature of the liquid in said vessel when positioned on said base.

8. The combination coffee maker and water heater of claim 6 wherein said second uniform rate of flow is on the order of four times said first rate of flow.

9. A combination coffee maker and water heater comprising means including a reservoir having heating means for heating a quantity of water from room temperature to a selected temperature suitable for extracting coffee from grounds, a cup-shaped vessel, a filter basket for receiving ground coffee and selectively positionable on said vessel to provide brewed coffee when hot water is poured through said filter basket, a housing supporting said reservoir above said vessel and filter basket, said reservoir having an outlet with valve means for dispensing said quantity of water at either one of two different rates of flow into said filter basket to make brewed coffee or directly into said vessel for making instant beverages, said valve means having a manually positionable control movable to a first position in which said quantity of water will be dispensed at a first uniform rate of flow which will be substantially equal to the flow through said filter basket and movable to a second position in which said quantity of water will be dispensed at a second uniform rate of flow which is substantially greater than said first rate of flow and which is greater than the maximum flow rate through said filter basket, said valve means including a valve body supported by said reservoir and a movable valve member mounted in said valve body, said valve member being movable from a closed position in one direction to obtain said first rate of flow through said valve means and in a second opposite direction to obtain said second rate of flow.

10. A combination coffee maker and water heater comprising means including a reservoir having heating means for heating a quantity of water from room temperature to a selected temperature suitable for extracting coffee from grounds, a cup-shaped vessel, a filter basket for receiving ground coffee and selectively positionable on said vessel to provide brewed coffee when hot water is poured through said filter basket, a housing supporting said reservoir above said vessel and filter basket, said reservoir having an outlet with valve means for dispensing said quantity of water at either one of two different rates of flow into said filter basket to make brewed coffee or directly into said vessel for making instant beverages, said valve means having a manually positionable control movable to a first position in which said quantity of water will be dispensed at first uniform rate of flow which will be substantially equal to the flow through said filter basket and movable to a second position in which said quantity of water will be dispensed at a second uniform rate of flow which is substantially greater than said first rate of flow and which is greater than the maximum flow rate through said filter basket, said reservoir being cup shaped having cylindrical side walls and a generally circular bottom and a sheathed electrical heating element secured in good heat transfer relation to said bottom, said element having inner and outer C-shaped annular portions which are coaxial with said reservoir with said element having adjacent ends of said portions connected together and having terminal ends at the other adjacent ends of said annular portions, a thermostatic switch connected in series with said heating element and being secured against said reservoir bottom to respond to the temperature of water contained in said reservoir, said valve means and said thermostat being mounted on said reservoir bottom in the opening between the ends of the two C-shaped annular portions of said heating element.

11. The combination coffee maker and water heater of claim 10 wherein said reservoir is provided with means for supporting a pair of bell cranks for pivotal movement about a common axis to control and thermostatic switch and said valve means, each said crank having a first arm extending outwardly of said reservoir for manual rotation of each said crank, each said crank having a second arm, one extending into engagement with said thermostatic switch and one extending into engagement with said valve means.

12. A combination coffee maker and water heater comprising means including a reservoir having heating means for heating a quantity of water from room temperature to a selected temperature suitable for extracting coffee from grounds, a cup-shaped vessel, a filter basket for receiving ground coffee and selectively positionable on said vessel to provide brewed coffee when hot water is poured through said filter basket, a housing supporting said reservoir above said vessel and filter basket, said reservoir having an outlet with valve means for dispensing said quantity of water at either one of two different rates of flow into said filter basket to make brewed coffee or directly into said vessel for making instant beverages, said valve means having a manually positionable control movable to a first position in which said quantity of water will be dispensed at a first uniform rate of flow which will be substantially equal to the flow through said filter basket and movable to a second position in which said quantity of water will be dispensed at a second uniform rate of flow which is substantially greater than said first rate of flow and which is greater than the maximum flow rate through said filter basket, said valve means including an elongated valve body having a first passageway extending through its length, in elongated valve member mounted in said first passageway in said valve body and having an operating end extending out of said valve body at one end and a seal end extending out of said valve body at the other end, said valve body being formed with a second passageway which connects with said first passageway and extends laterally thereof, seal means between said valve body and said valve member to prevent liquid flow through said first passageway from said second passageway to said one end of said valve body, a cup-shaped valve cap secured to the other end of said valve body and receiving said other end of said valve member, said valve cap having a laterally extending inlet which faces in the opposite direction from said second passageway, said valve cap and valve body forming a chamber with which said inlet and second passageway communicate, a disc-like closure slidably supported by said other end of said valve member, said closure being movable between a first and second axially displaced position on said valve member, said valve member being selectively positionable in a valve closed or in two valve open positions, in said valve closed position said closure being positioned to seal said first passageway at one end and obstruct liquid flow from said inlet to said second passageway, said closure in said second position of said valve member being displaced into said valve cap from said sealing position permitting liquid flow through said first passageway to said second passageway, in said first position of said valve member said closure is positioned to seal said first passageway and said valve member and closure are positioned to open a bypass passageway extending through said valve member to permit liquid flow through said closure and said valve member from said valve cap to said second passageway.

13. A combination coffee maker and water heater comprising, a cup-shaped water reservoir having cylindrical side walls and a generally circular bottom and a sheathed electrical heating element secured in good heat transfer relation to said bottom, said element having inner and outer C-shaped annular portions which are concentric with said reservoir with said element having adjacent ends of said portions connected together and having terminal ends at the other adjacent ends of said annular portions, a thermostatic switch connected in series with said heating element and being secured against said reservoir bottom to respond to the temperature of water contained in said reservoir, said reservoir having a centrally disposed outlet in said bottom with valve means selectively controlling the flow through said outlet, said valve means and said thermostat being mounted on said reservoir bottom in the opening between the ends of the two C-shaped annular portions of said heating element.

14. The combination coffee maker and water heater of claim 13 wherein said reservoir is provided with means for supporting a pair of bell cranks for pivotal movement to control said thermostatic switch and said valve means, each said crank having a first arm extending outwardly of said reservoir for manual rotation of each said crank, each said crank having a second arm one of which extends into engagement with said thermostatic switch and the other of which extends into engagement with said valves means.

15. A valve means for use in a combined coffee maker and water heater comprising an elongated valve body having a first passageway extending through its length, an elongated valve member mounted in said first passageway in said valve body and having an operating end extending out of said valve body at one end and a seal end extending out of said valve body at the other end, said valve body being formed with a second passageway which connects with said first passageway and extends laterally thereof, seal means between said valve body and said valve member to prevent liquid flow through said first passageway from said second passageway to said one end of said valve body, a cup-shaped valve cap secured to the other end of said valve body and receiving said other end of said valve member, said valve cap having a laterally extending inlet which faces in the opposite direction from said second passageway, said valve cap and valve body forming a chamber with which said inlet and second passageway communicate, a disc-like closure slidably supported by said other end of said valve member, said closure being movable between a first and second axially displaced position on said valve member, said valve member being selectively positionable in a valve closed or in two valve open positions a first position having a high rate of water flow and a second position having a low rate of flow, in said valve closed position said closure being positioned to seal said first passageway at one end and obstruct liquid flow from said inlet to said second passageway, said closure in said first position of said valve member being displaced into said valve cap from said sealing position permitting liquid flow through said first passageway to said second passageway, in said second position of said valve member said closure is positioned to seal said first passageway and said valve member and closure are positioned to open a bypass passageway extending through said valve member to permit liquid flow through said closure and said valve member from said valve cap to said second passageway.

* * * * *